United States Patent
Osterhoff et al.

(10) Patent No.: US 10,596,939 B2
(45) Date of Patent: Mar. 24, 2020

(54) POLYMERIC SEAT CUSHION FRAME INTEGRATED MODULE ATTACHMENT SYSTEM

(71) Applicant: Ford Global Technologies, LLC, Dearborn, MI (US)

(72) Inventors: Daniel Jay Osterhoff, Northville, MI (US); David Andree, Commerce Township, MI (US); Kimberly Ann Broski, Harrison Township, MI (US); Diane Carol Favors, Dearborn, MI (US); Lori Ann Donze, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 15/840,678

(22) Filed: Dec. 13, 2017

(65) Prior Publication Data

US 2019/0176666 A1    Jun. 13, 2019

(51) Int. Cl.
| | |
|---|---|
| *B60N 2/68* | (2006.01) |
| *B60N 2/62* | (2006.01) |
| *B60N 2/90* | (2018.01) |
| *B60N 2/66* | (2006.01) |
| *B60N 2/06* | (2006.01) |
| *B60N 2/02* | (2006.01) |

(52) U.S. Cl.
CPC ............ *B60N 2/62* (2013.01); *B60N 2/68* (2013.01); *B60N 2/686* (2013.01); *B60N 2/90* (2018.02); *B60N 2/06* (2013.01); *B60N 2/66* (2013.01); *B60N 2002/024* (2013.01)

(58) Field of Classification Search
CPC ..... B60N 2002/024; B60N 2/686; B60N 2/62
See application file for complete search history.

(56) References Cited

U.S. PATENT DOCUMENTS

| | | | |
|---|---|---|---|
| 4,530,541 A | 7/1985 | Resag et al. | |
| 4,844,533 A | 7/1989 | Dowd et al. | |
| 4,969,687 A | 11/1990 | Higuchi et al. | |
| 5,269,060 A | 12/1993 | Dowd et al. | |
| 5,284,381 A | 2/1994 | Aoki et al. | |
| 5,315,798 A | 5/1994 | Zarwell | |
| 5,326,155 A | 7/1994 | Wild | |
| 5,820,221 A * | 10/1998 | Greaves | A47C 3/16 297/378.14 |
| 5,836,645 A | 11/1998 | Sakaue et al. | |
| 5,879,055 A | 3/1999 | Dishner et al. | |
| 6,234,518 B1 | 5/2001 | Ryl et al. | |
| 6,412,874 B1 | 7/2002 | Mayer | |
| 6,429,544 B1 | 8/2002 | Sasaki et al. | |
| 6,481,179 B2 | 11/2002 | Zen | |
| 7,775,603 B2 | 8/2010 | Mundell et al. | |
| 7,850,247 B2 * | 12/2010 | Stauske | B60N 2/5621 297/452.24 |

(Continued)

*Primary Examiner* — Timothy J Brindley
(74) *Attorney, Agent, or Firm* — Vichit Chea; Price Heneveld LLP

(57) ABSTRACT

A seating assembly includes a seat frame and a seating support cushion. An adjustable cushion pan is rotatably coupled with the seat frame. A plurality of downwardly-extending connection members are integral with and extend from a bottom surface of the cushion pan. An electronic seating module is operably coupled directly to select ones of the plurality of downwardly-extending connection members.

17 Claims, 6 Drawing Sheets

(56) References Cited

U.S. PATENT DOCUMENTS

| | | | |
|---|---|---|---|
| 9,039,081 B2 | 5/2015 | Arefi et al. | |
| 9,796,310 B1* | 10/2017 | Line | B60N 2/7094 |
| 9,878,680 B2* | 1/2018 | Mita | B60R 16/0215 |
| 9,987,950 B2* | 6/2018 | Yadav | B60N 2/0232 |
| 10,259,362 B2* | 4/2019 | Penn | B60N 2/5825 |
| 2005/0168041 A1* | 8/2005 | Glance | B60N 2/68 |
| | | | 297/452.18 |
| 2009/0008970 A1* | 1/2009 | Flory | B60N 2/5621 |
| | | | 297/180.14 |
| 2009/0015043 A1* | 1/2009 | Macht | B60H 1/00285 |
| | | | 297/180.14 |
| 2009/0309397 A1* | 12/2009 | Gross | B60N 2/4221 |
| | | | 297/216.1 |
| 2010/0060045 A1* | 3/2010 | Gross | B60N 2/4221 |
| | | | 297/216.1 |
| 2013/0119715 A1* | 5/2013 | Medoro | B60N 2/686 |
| | | | 297/180.1 |
| 2016/0185265 A1* | 6/2016 | Romer | B60N 2/68 |
| | | | 297/216.1 |
| 2017/0334318 A1* | 11/2017 | Nakamura | B60N 2/0732 |
| 2018/0272908 A1* | 9/2018 | Onuma | B60N 2/56 |
| 2018/0290575 A1* | 10/2018 | Seibold | B60N 2/50 |

* cited by examiner

POLYMERIC SEAT CUSHION FRAME INTEGRATED MODULE ATTACHMENT SYSTEM

FIELD OF THE DISCLOSURE

The present disclosure generally relates to a seat cushion, and more particularly to a polymer seat cushion frame integrated module attachment system.

BACKGROUND OF THE DISCLOSURE

The optimization of utilizable space in a vehicle is becoming more important as vehicles are becoming smaller and lighter to less fuel consumption. In an effort to improve fuel efficiency and gain available space within a vehicle, efforts are being made to integrate systems, use light-weight materials, and eliminate excess components from the vehicle.

SUMMARY OF THE DISCLOSURE

According to one aspect of the present disclosure, a seating assembly includes a seat frame and a seating support cushion. An adjustable cushion pan is rotatably coupled with the seat frame. A plurality of downwardly-extending connection members are integral with and extend from a bottom surface of the cushion pan. An electronic seating module is operably coupled directly to select ones of the plurality of downwardly-extending connection members.

According to another aspect of the present disclosure, a cushion pan for a seating assembly includes a body having a rear coupling portion. A peripheral rim extends about first and second sides and a forward portion of the body. A plurality of support flanges extend rearwardly from a forward portion of the peripheral rim. A plurality of connection members are integral with and extend downwardly from a bottom surface of the body. An electronics control module is operably coupled with at least two of the connection members and extend past at least one of the connection members.

According to yet another aspect of the present disclosure, a seating assembly includes a seat frame. An adjustable cushion pan is operably coupled with the seat frame. A plurality of downwardly-extending connection members are integral with and extend from a bottom surface of the cushion pan. An electronic seating module is operably coupled directly to a select number of the plurality of downwardly-extending connection members.

Embodiments of the first aspect, the second aspect, and the third aspect of the present disclosure, as set forth in the preceding paragraphs, can include any one or a combination of the following features:
- an adjustable cushion pan includes both longitudinally-extending support flanges and laterally-extending support flanges;
- a plurality of downwardly-extending connection members include a boss having a plurality of supporting extensions that extend outwardly therefrom;
- an electronic seating module includes coupling members configured to abut at least one of the plurality of downwardly-extending connection members;
- the electronic seating module is repositionable under the adjustable cushion pan by coupling the electronic seating module to others of the plurality of downwardly-extending connection members;
- tapered support flanges extending rearwardly from the plurality of downwardly-extending connection members;
- the electronic seating module includes a casing with lateral connection flanges; and
- the electronic seating module extends below longitudinally-extending flanges and lateral flanges.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
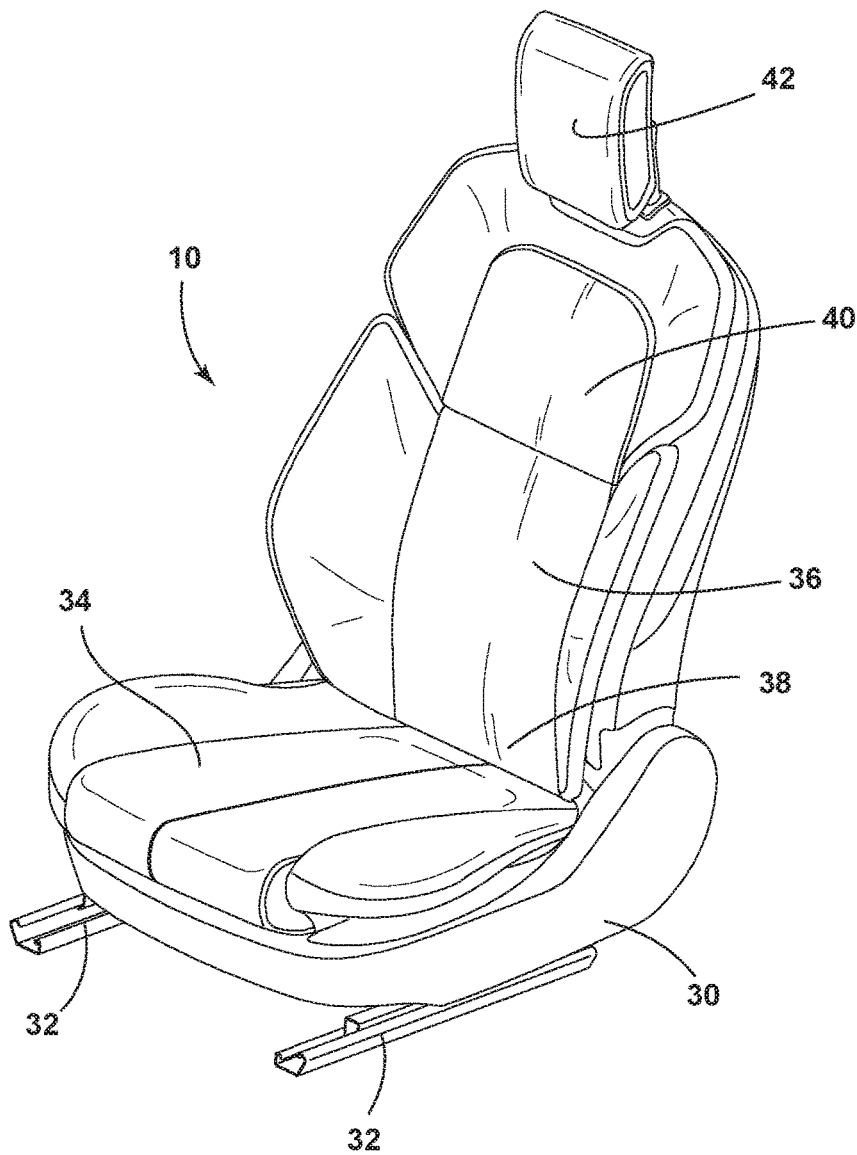
FIG. 1 is a front perspective view of a seating assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-7, reference numeral 10 generally designates a seating assembly that includes a seat frame 12 and a seating support cushion 14. An adjustable cushion pan 16 is rotatably coupled with the seat frame 12. A plurality of downwardly-extending connection members 18 are integral with and extend from a bottom surface 20 of the adjustable cushion pan 16. An electronic seating module 22 is operably coupled directly to less than all of the plurality of downwardly-extending connection members 18.

Figure 2:
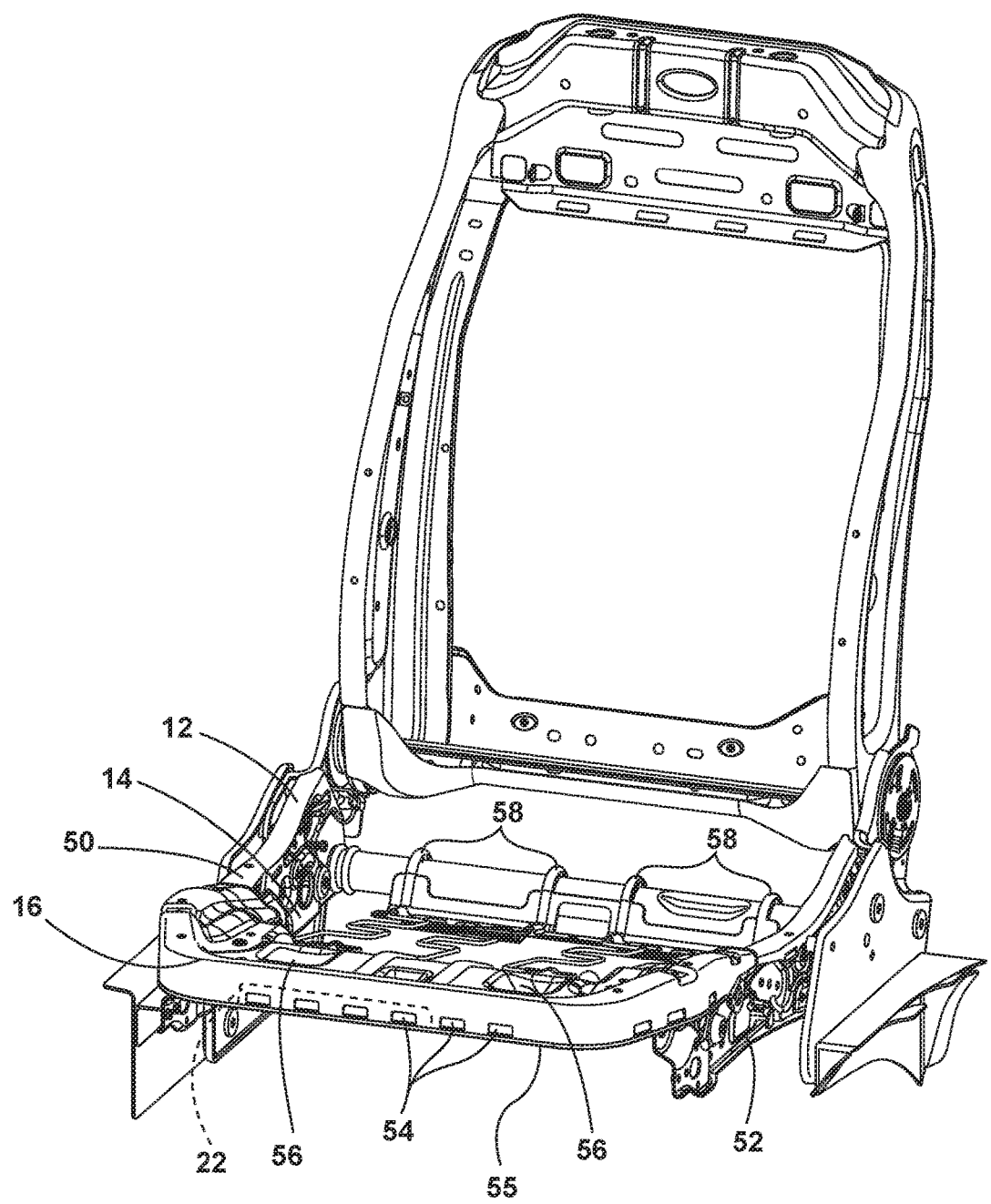
FIG. 2 is a front perspective view of a seating assembly frame having an adjustable cushion pan of a seating assembly of the present disclosure.

With reference now to FIGS. 1 and 2, the seating assembly 10 may be a vehicle seating assembly and used in any vehicle, such as a car, a truck, a van, etc. It is also contemplated that the concept set forth in this disclosure may be utilized in a front or forward position of the vehicle as well as a rear or rearward position of the vehicle. The seating assembly 10, as illustrated, includes a seat base 30 that is positioned on rail slides 32 to allow fore and aft movement of the seating assembly 10 relative to the vehicle. A seat 34 is operably coupled with the seat base 30 and is movable relative thereto, as set forth in further detail below. In addition, a seatback 36 of the seating assembly 10 includes a lower lumbar region 38 and an upper thoracic region 40 as well as a head restraint 42. Each of the components of the seatback 36 may be configured for adjustability to properly support the weight of various occupants inside the vehicle.

With reference now to FIG. 2, the adjustable cushion pan 16 is generally configured for supporting an occupant's legs on the seating assembly 10. It is generally contemplated that the adjustable cushion pan 16 may be pivotably coupled directly or indirectly with first and second side members 50, 52 of the seating assembly 10 or may be slidably coupled with the first and second side members 50, 52 of the seating assembly 10. In addition, it is generally contemplated that the adjustable cushion pan 16 may include a variety of additional features, including trim securing features 54, a reinforced peripheral rim 55, forward suspension securing features 56, rearward suspension hooks 58, etc.

Figure 3:
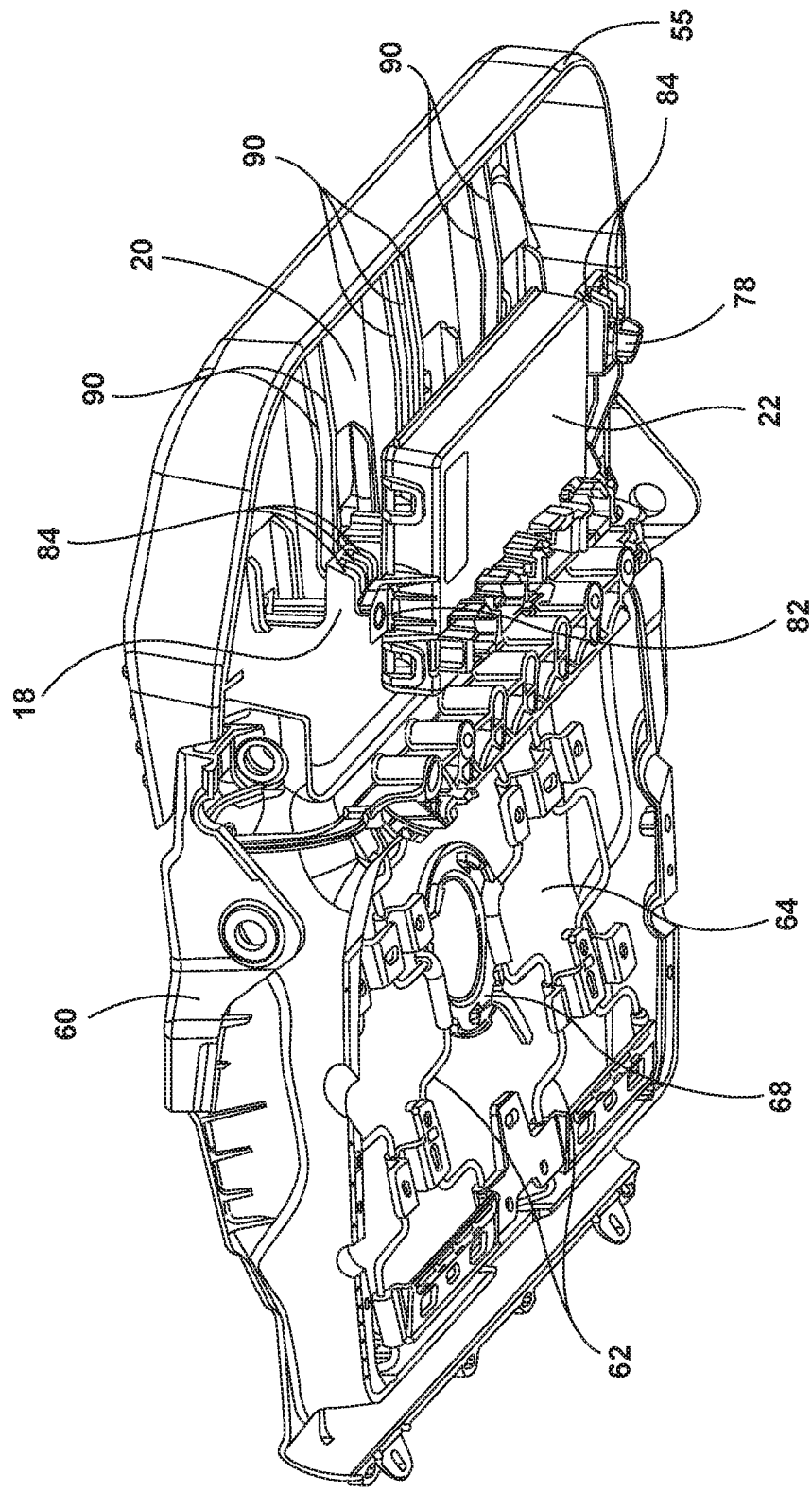
FIG. 3 is a front perspective view of an adjustable cushion pan of a seating assembly of the present disclosure that is rotatably coupled with a seat carrier.
Figure 4:
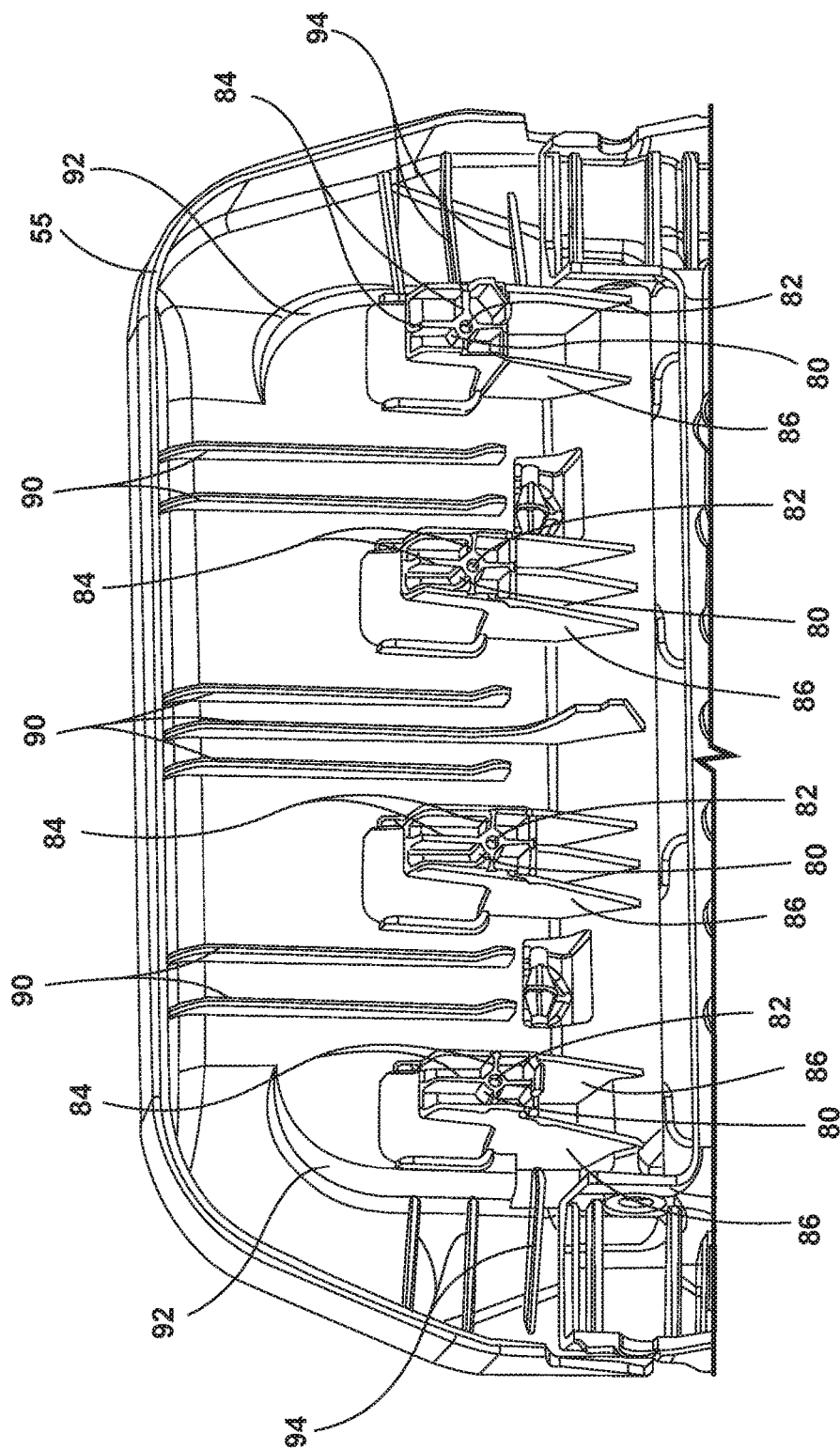
FIG. 4 is an enlarged bottom plan view of the adjustable cushion pan of FIG. 3.

With reference now to FIGS. 3 and 4, the adjustable cushion pan 16, as illustrated, is rotatably coupled with a seat carrier 60. The seat carrier 60 includes a plurality of suspension members 62 that extend across an interior portion 64 of the seat carrier 60. The seat carrier 60 generally defines an enlarged opening in a middle portion of the seat carrier 60, which is configured to receive the suspension members 62, as well as a climate control feature 68 configured to aid in cooling or warming a seating surface of the seating support cushion 14 of the seating assembly 10. A variety of other functions are available in and on the seating assembly 10. These components may be operably coupled with one or more electronic seating modules 22. Depending on the components and the position of the seat 34 within the vehicle, it may be desirable to position the electronic seating module 22 at different locations under the seat carrier 60.

The electronic seating module 22, as illustrated in FIG. 3, is configured to be operably coupled with the bottom surface 20 of the adjustable cushion pan 16. The adjustable cushion pan 16 includes a casing 74 that has lateral connection flanges 76 that are configured to receive fasteners. In addition, the plurality of downwardly-extending connection members 18 are disposed on the bottom surface 20 of the adjustable cushion pan 16 and are configured to receive mechanical fasteners 78 that secure the electronic seating module 22 in place under the adjustable cushion pan 16. The plurality of downwardly-extending connection members 18 include a plurality of bosses 80 that each define a receiving aperture 82 specifically configured to receive the mechanical fasteners 78. Each of the lateral connection flanges 76 are configured to abut one of the plurality of bosses 80, before receiving the mechanical fastener 78. However, it will be understood that other securing features may also be used, including snap-fit clips, heat stakes, etc. The plurality of downwardly-extending connection members 18 include supporting extensions 84 extending from each side thereof. In addition, a plurality of support flanges 86 extend rearwardly from the plurality of downwardly-extending connection members 18. The support flanges 86 taper rearwardly and provide stability and support to the plurality of downwardly-extending connection members 18 during installation of the electronic seating module 22 with the underside of the adjustable cushion pan 16. In addition, the underside of the adjustable cushion pan 16 includes a plurality of longitudinally-extending cross members 90 configured to provide support to the adjustable cushion pan 16. The adjustable cushion pan 16 also includes vertically aligned walls 92 that extend in an arc, and laterally-extending cross members 94 that extend in a direction generally orthogonal to the longitudinally-extending cross members 90, and which add to the structural integrity of the adjustable cushion pan 16.

Figure 5:
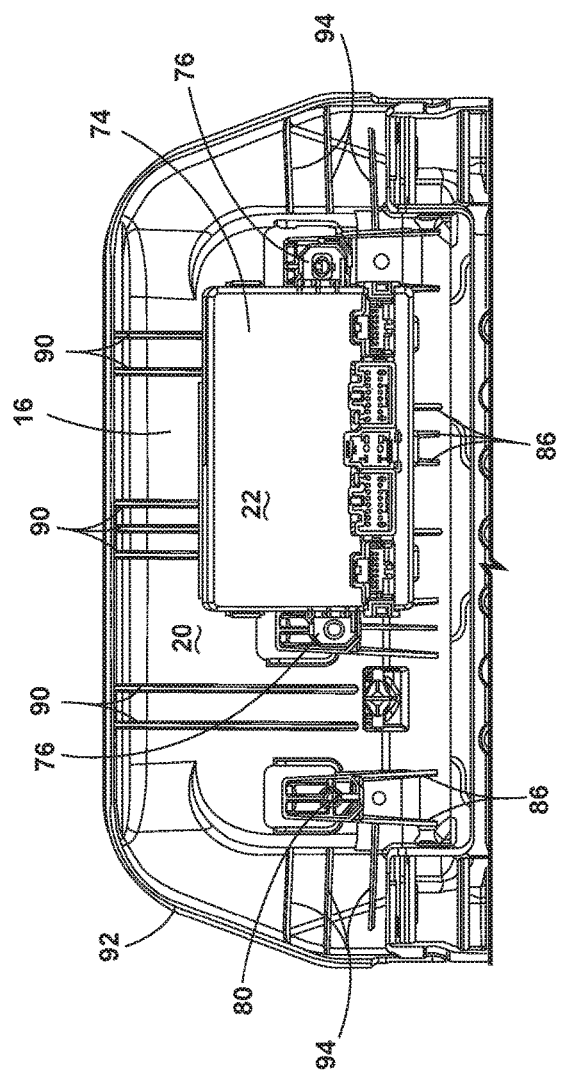
FIG. 5 is an enlarged bottom plan view of an electronic seating module of the present disclosure positioned on the right side of an underside of an adjustable cushion pan.
Figure 6:
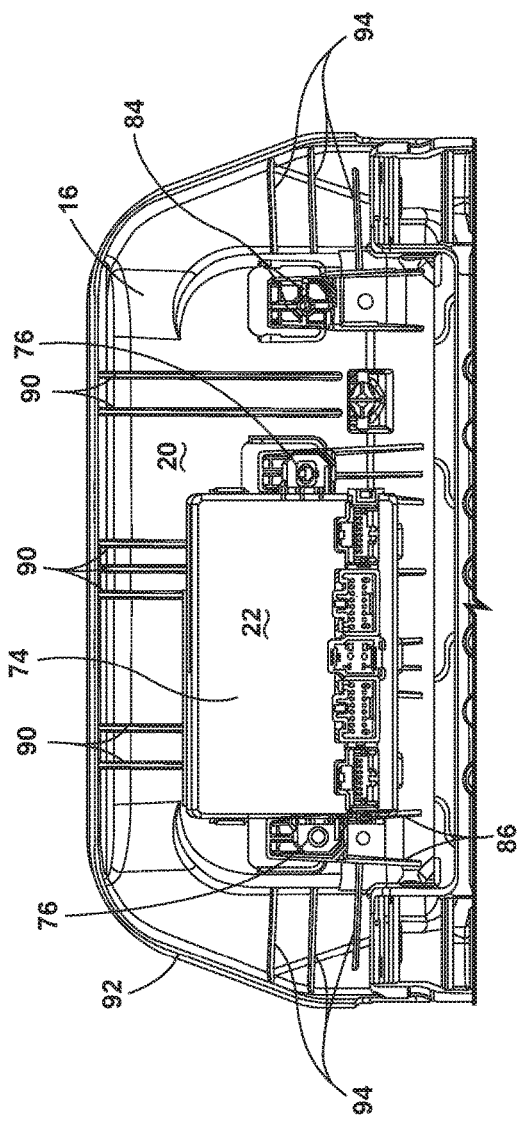
FIG. 6 is an enlarged front elevational view of an electronic seating module of the present disclosure positioned on the left side of an underside of an adjustable cushion pan.

With reference now to FIGS. 5 and 6, the electronic seating module 22 is directly coupled to an underside of the adjustable cushion pan 16 via the plurality of downwardly-extending connection members 18. As can be seen, as a result of the plurality of downwardly-extending connection members 18, the electronic seating module 22 can be moved laterally to accommodate different arrangements within a vehicle. For example, it may be desirable to have the electronic seating module 22 on an inboard side of the seat. In this instance, the electronic seating module 22 may be positioned on the right side of the underside of the adjustable cushion pan 16 on the driver's side, and on the left side of the passenger's side of the adjustable cushion pan 16.

Figure 7:
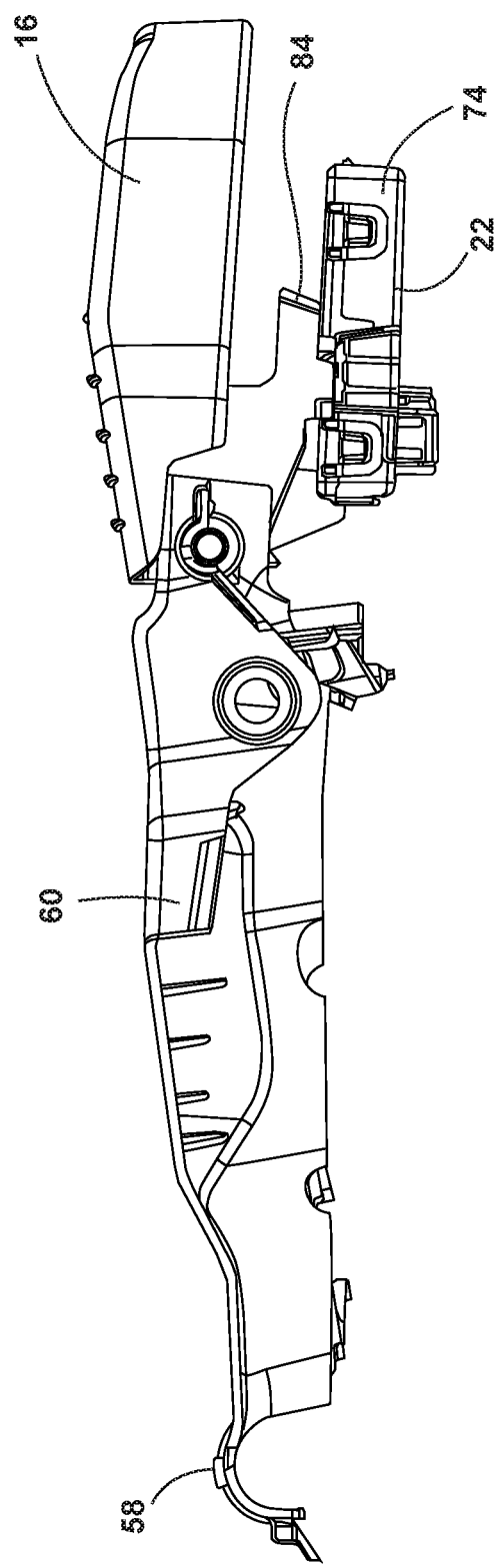
FIG. 7 is a front perspective view of an electronic seating module of the present disclosure placed directly underneath and generally aligned with an underside of an adjustable cushion pan.

With reference now to FIG. 7, it is also contemplated that the new design provides for a tighter packaging of the electronic seating module 22, as compared to previous designs that include brackets. Accordingly, the electronic seating module 22 can be placed directly underneath and generally aligned in a parallel fashion with the underside of the adjustable cushion pan 16. This is an improvement over traditional systems that include a bracket that calls for the electronic seating module 22 to be spaced a predetermined distance from the underside of the adjustable cushion pan 16, thereby creating less space under the seat 34 for storage of items during travel. The direct coupling of the electronic seating module 22 to the adjustable cushion pan 16 minimizes the additional need of brackets and securing devices that would otherwise be necessary to secure the electronic seating module 22 to the underside of the adjustable cushion pan 16. The added bracket increases weight and bulk under the seat 34 resulting in less space to store cargo within the vehicle. The repositionability and lateral variance available with the present disclosure allows for more cargo space under the seat 34, and also provides adjustability for accommodating other features below the seat 34.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A seating assembly comprising:
   a seat frame;
   a seating support cushion;
   an adjustable cushion pan rotatably coupled with the seat frame;
   a plurality of downwardly-extending connection members that are integral with and which extend from a bottom surface of the adjustable cushion pan; and
   an electronic seating module operably coupled directly to select ones of the plurality of downwardly-extending connection members, wherein the electronic seating module is repositionable under the adjustable cushion pan by coupling the electronic seating module to others of the plurality of downwardly-extending connection members.

2. The seating assembly of claim 1, wherein the adjustable cushion pan includes both longitudinally-extending cross members and laterally-extending cross members.

3. The seating assembly of claim 1, wherein the plurality of downwardly-extending connection members include a boss having a plurality of supporting extensions that extend outwardly therefrom.

4. The seating assembly of claim 1, wherein the electronic seating module includes a casing with a lateral connection flange configured to abut at least one of the plurality of downwardly-extending connection members.

5. The seating assembly of claim 1, further comprising:
   tapered support flanges extending rearwardly from the plurality of downwardly-extending connection members.

6. The seating assembly of claim 1, wherein the electronic seating module is positioned below a pivot axis of the adjustable cushion pan.

7. The seating assembly of claim 1, wherein the electronic seating module extends below longitudinally-extending flanges and laterally-extending flanges.

8. A cushion pan for a seating assembly comprising:
   a body including a rear coupling portion;
   a peripheral rim that extends about first and second sides and a forward portion of the body;
   a plurality of support flanges extending rearwardly from a forward portion of the peripheral rim;
   a plurality of connection members that are integral with and which extend downwardly from a bottom surface of the body; and
   an electronics control module operably coupled with at least two of the plurality of connection members and extending past at least one of the plurality of connection members, wherein the electronics control module is repositionable under said cushion pan by coupling the electronics control module to others of the plurality of connection members.

9. The cushion pan of claim 8, further comprising:
   longitudinally-extending cross members and laterally-extending cross members.

10. The cushion pan of claim 8, wherein the plurality of connection members include a boss having a plurality of supporting extensions that extend outwardly therefrom.

11. The cushion pan of claim 8, wherein the electronics control module includes a casing with a lateral connection flange configured to abut at least one of the plurality of connection members.

12. The cushion pan of claim 8, further comprising:
   tapered support flanges extending rearwardly from the plurality of connection members.

13. A seating assembly comprising:
    a seat frame;
    an adjustable cushion pan operably coupled with the seat frame;
    a plurality of downwardly-extending connection members that are integral with and which extend from a bottom surface of the adjustable cushion pan; and
    an electronic seating module operably coupled directly to a select number of the plurality of downwardly-extending connection members, wherein the electronic seating module is repositionable under the adjustable cushion pan by coupling the electronic seating module to others of the plurality of downwardly-extending connection members.

14. The seating assembly of claim 13, wherein the adjustable cushion pan includes both longitudinally-extending cross members and laterally-extending cross members.

15. The seating assembly of claim 13, wherein the plurality of downwardly-extending connection members include a boss having a plurality of supporting extensions that extend outwardly therefrom.

16. The seating assembly of claim 13, wherein the electronic seating module includes a casing with a lateral connection flange configured to abut at least one of the plurality of downwardly-extending connection members.

17. The seating assembly of claim 13, further comprising:
tapered support flanges extending rearwardly from the plurality of downwardly-extending connection members.

\* \* \* \* \*